(12) United States Patent
Hermann

(10) Patent No.: US 6,279,479 B1
(45) Date of Patent: Aug. 28, 2001

(54) METHOD AND FIRING CIRCUIT FOR TRIGGERING A VEHICLE OCCUPANT PROTECTION SYSTEM

(75) Inventor: Stefan Hermann, Köfering (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/568,940

(22) Filed: May 11, 2000

Related U.S. Application Data

(63) Continuation of application No. PCT/DE98/02980, filed on Oct. 8, 1998.

(30) Foreign Application Priority Data

Nov. 11, 1997 (DE) .............................................. 197 49 856

(51) Int. Cl.$^7$ .................................................. B60R 21/01
(52) U.S. Cl. ........................ 102/218; 102/218; 102/206
(58) Field of Search ..................................... 102/218, 206

(56) References Cited

U.S. PATENT DOCUMENTS

| | | |
|---|---|---|
| 3,967,557 * | 7/1976 | Irish, Jr. .............................. 102/70.2 |
| 5,522,617 | 6/1996 | Swart . |
| 5,554,890 | 9/1996 | Kinoshita . |
| 6,000,338 * | 12/1999 | Shann ................................... 102/217 |
| 6,072,246 * | 6/2000 | Schafer ................................ 307/10.1 |

FOREIGN PATENT DOCUMENTS

2300955A * 11/1996 (GB) ................................... 307/10.1

* cited by examiner

Primary Examiner—Charles T. Jordan
Assistant Examiner—Lulit Semunegus
(74) Attorney, Agent, or Firm—Herbert L. Lerner; Laurence A. Greenberg; Werner H. Stemer

(57) ABSTRACT

To fire a firing cap of a vehicle occupant protection system of a motor vehicle, at least two firing capacitors are provided which initially remain connected in parallel at the start of a firing process and are connected in series after expiry of a time interval from the start of the firing process. It is ensured that a firing current which flows across the firing cap is always of a sufficient magnitude and at the same time initial power losses are avoided.

11 Claims, 2 Drawing Sheets

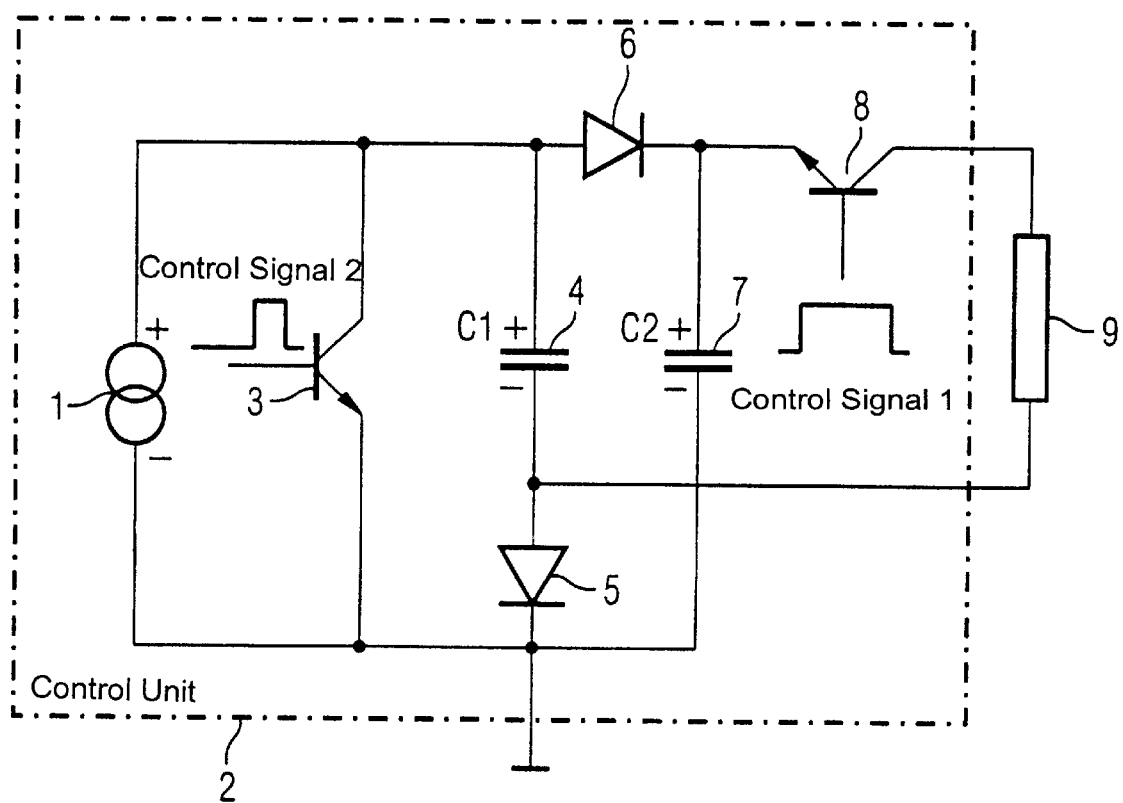

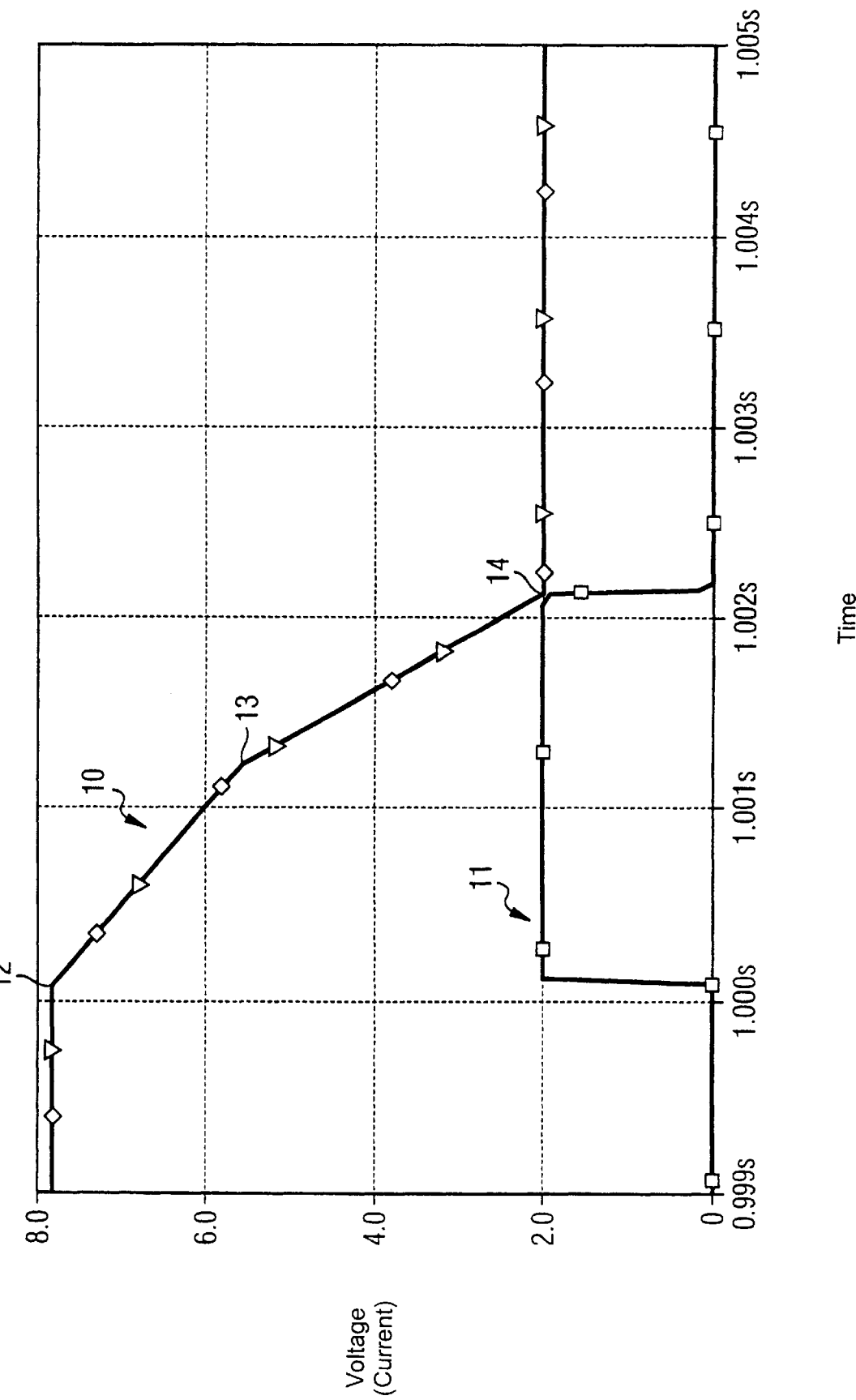

ically an object of the invention to provide a

METHOD AND FIRING CIRCUIT FOR TRIGGERING A VEHICLE OCCUPANT PROTECTION SYSTEM

CROSS-REFERENCE TO RELATED APPLICATION

This is a continuation of copending International Application PCT/DE98/02980, filed Oct. 8, 1998, which designated the United States.

BACKGROUND OF THE INVENTION

Field of the Invention

The invention relates to a method for firing a firing cap of a vehicle occupant protection system of a motor vehicle. Furthermore, the invention is directed at a firing circuit of the vehicle occupant protection system of the motor vehicle. The firing circuit contains a firing switch connected in series with the firing cap and can be actuated by a firing pulse. The circuit further contains at least two capacitors for energizing the firing cap.

Because the vehicle occupant protection system of the motor vehicle must reliably trigger in the event of an accident (crash) even if a connection to the vehicle electrical system happens to be interrupted, one or more firing capacitors are usually provided. The firing capacitors are charged during normal operation of the motor vehicle and make available the power that is necessary to fire the firing cap or caps of the vehicle occupant protection system. The firing caps are connected to the firing capacitors via a firing switch that can be provided with a current limiter. Because a minimum voltage has to be maintained at the firing cap during the entire firing period in order to ensure that there is a current which does not drop below a specific minimum value, a relatively large part of the power usually remains stored uselessly in the capacitors. The quantity of power that remains must be greater here than the quantity of power consumed. Therefore, relatively large firing capacitors with a high capacitance value and high charge value have to be made available which require large amounts of space and therefore constitute an obstacle to a more compact configuration of the firing circuit. Because the firing caps have to be/are to be fed with a constant current, a current limiter, which consumes a large part of the power, is used.

Published, Non-Prosecuted German Patent Application DE 44 09 019 A1 discloses a firing circuit for a vehicle occupant protection device in a motor vehicle in which two firing capacitors make available sufficient power. Here, only the first firing capacitor is discharged within a first time period starting from the firing before only the second firing capacitor is discharged after a defined time period starting from the firing.

International Patent Disclosure WO 93/17893 discloses a method for triggering a vehicle occupant protection system and a firing circuit. In the known firing circuit, two or more firing capacitors are provided which are connected in parallel with one another and with the motor vehicle battery during normal operation of the motor vehicle, with the result they are each charged to the voltage of the vehicle electrical system. The object of this publication is, in the event of an accident, to supply the firing cap immediately with a voltage that lies significantly above the voltage of the vehicle electrical system, so that the triggering process can reliably start. For this purpose when an accident is sensed, the firing capacitors are immediately connected in series and the firing switch is closed so that the firing cap is supplied with a voltage which is twice as high as the voltage of the vehicle electrical system or is even higher when a plurality of capacitors are used.

SUMMARY OF THE INVENTION

It is accordingly an object of the invention to provide a method and a firing circuit for triggering a vehicle occupant protection system which overcome the above-mentioned disadvantages of the prior art methods and devices of this general type, which permits reliable firing of the firing cap using relatively small firing capacitors.

With the foregoing and other objects in view there is provided, in accordance with the invention, a method for firing a vehicle occupant protection system, which includes:

activating a firing circuit having a firing cap and a firing switch connected in series with the firing cap and the firing switch activated by a firing pulse, the firing circuit further having at least two firing capacitors connected in parallel with one another before a firing process, the firing capacitors can be charged by one of a voltage source and a current source and discharge a stored charge simultaneously into the firing cap in response to the firing pulse; and maintaining the firing capacitors to remain connected in parallel at a start of the firing pulse and connected in series after a time delay after the start of the firing pulse.

The invention is distinguished by the possibility of using relatively small firing capacitors without the reliability of the correct triggering of the vehicle occupant protection system being adversely affected.

In the invention, a firing process is thus started using firing capacitors that are connected in parallel, the firing capacitors then being, however, switched over from the parallel connection to a series connection during the still persistent firing pulse. This procedure provides the following advantages. At the start of the firing process, the firing cap is supplied only with the simple charge voltage of the firing capacitors so that a firing current flows which has the value which is sufficient to activate the firing cap, but is not higher than the current limiting value. This permits a power loss caused by the current limitation to be avoided. Such a power loss could otherwise occur if the process is begun with a significantly higher excitation voltage provided by an initial series connection of the firing capacitors. However, during the firing process the charge stored in the firing capacitors is reduced so that the flow of current could then drop below the minimum required value. This tendency is counteracted according to the invention by the fact that the firing capacitors are switched over from the parallel connection to the series connection during the firing pulse. The composite voltage which then results being (at least) twice as high as the individual voltage of the firing capacitors which have been connected in parallel until then. The composite voltage is sufficient to maintain the flow of current at or above the minimum current value for a relatively long time without current limitation being performed on the current. With the invention it is thus possible to use a current limiter which is configured for a low power loss.

The switching over from the parallel connection to the series connection is carried out preferably if the voltages at the firing capacitors are approximately halved, i.e. after approximately half of the firing time or in the center of the firing pulse. However, the switching over can also take place earlier or later, preferably between 30% and 70% of the duration of the firing pulse. The switching over can take place after expiry of a specific time interval from the start of the firing pulse. Alternatively, there may also be provision for the voltage and/or the current of the firing pulse to be measured and for the switching over when the voltage and/or the current drops to be carried out to or below a predefined limiting value. In particular, there may also be provision for the firing capacitor voltage to be measured and for the switching over to take place when the voltage drops to or below a predefined limiting value.

After the switching over to series connection, the current can continue to flow across the firing cap until the voltages at the firing capacitors are halved again. Owing to this configuration, only approximately a quarter of the original power remains in the firing capacitors. As a result of this, the overall capacitance of the firing capacitors can be reduced by approximately 25% compared with a procedure without the series connection, with the result that more compact firing capacitors can be used and accordingly the dimensions of the firing circuit can be reduced. The size of the chip area of the current limiter can also be reduced.

It is also possible to use more than two firing capacitors which initially remain connected in parallel at the start of the firing pulse and are then either all connected in series or else merely connected in series to a certain extent and remain in a parallel connection to a certain extent.

With the foregoing and other objects in view there is further provided, in accordance with the invention, in combination with a vehicle occupant protection system of a motor vehicle, a firing circuit for the vehicle occupant protection system, the firing circuit includes:
a firing cap;
a firing switch connected in series with the firing cap and the firing switch receiving and activated by a firing pulse;
at least two firing capacitors to be charged by one of a voltage source and a current source;
a control circuit connected to the firing switch and generating the firing pulse and a switch-over pulsed; and
a changeover switch connected to the firing capacitors for switching over the firing capacitors between a parallel connection of the firing capacitors and a series connection of the capacitors, and in an event requiring firing of the firing cap the control circuit initially generating the firing pulse for simultaneously discharging the firing capacitors and only applying after a time delay the switch-over pulse to the changeover switch to switch over the firing capacitors from the parallel connection to the series connection.

In accordance with an added feature of the invention, the firing switch has a current limiting function.

In accordance with an additional feature of the invention, a diode is provide which is connected in series with one of the firing capacitors, and the changeover switch has a first terminal and a second and is connected in parallel with the series connection of the diode and the one of the firing capacitors.

In accordance with another feature of the invention, there is provided a further diode having a first terminal connected to the first terminal of the changeover switch and a second terminal, and another of the firing capacitors having a first terminal connected to the second terminal of the further diode and a second terminal connected directly to the second terminal of the changeover switch.

In accordance with a further added feature of the invention, the firing capacitors are connected in series after expiry of a specific time interval from a start of the firing pulse.

In accordance with a further additional feature of the invention, the firing pulse has a duration and the specific time interval is 30% to 70% of the duration of the firing pulse.

In accordance with a concomitant feature of the invention, the firing pulse has a voltage and a current, the firing switch has a base terminal, and including a measuring device connected to the base terminal for measuring at least one of the voltage and the current of the firing pulse, the control circuit switching over the changeover switch to the series connection if at least one of the voltage and the current has dropped to a specific value.

Other features which are considered as characteristic for the invention are set forth in the appended claims.

Although the invention is illustrated and described herein as embodied in a method and a firing circuit for triggering a vehicle occupant protection system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a circuit diagram of an exemplary embodiment of a firing circuit according to the invention; and FIG. 2 is a chart showing a variation in voltage and/or current over time during a firing process.

DESCRIPTION OF THE PREFERRED EMBODIMENTS

In all the figures of the drawing, sub-features and integral parts that correspond to one another bear the same reference symbol in each case. Referring now to the figures of the drawing in detail and first, particularly, to FIG. 1 thereof, there is shown an exemplary embodiment of a firing circuit according to the invention. A current source or generator 1 is provided which may be formed by a motor vehicle battery or by a current generator circuit which is supplied by the vehicle battery and constitutes a component of a control unit 2 of a non-illustrated vehicle occupant protection system. The control unit 2 is illustrated in FIG. 1 by a dotted contour line, and the further components of the control unit 2, for example, a microprocessor which evaluates the accident sensor signals, are not shown. The vehicle occupant protection system can be, for example an airbag system, a seat belt pretensioning system or some other safety device which is triggered by one or more firing caps which activate, for example, a gas generator.

The firing circuit also contains a changeover switch 3, which is formed, for example, by a switching transistor which is activated by a driver signal, control signal 2, activated by the control unit 2, and is connected with its main contacts in parallel with the current generator 1. A firing capacitor 4, that is embodied, for example, as an electrolytic capacitor, is connected by one terminal to a positive terminal of the current generator 1 and by the other terminal to an anode of a rectifier diode 5. An cathode of the rectifier diode 5 is connected to the other terminal of the current generator 1, the other terminal being at ground potential. An anode of a rectifier diode 6 is also connected to a positive electrode of the first firing capacitor 4 and its cathode is connected to a positive electrode of a second firing capacitor 7 and to a main contact of a firing switch 8. Another electrode (negative foil) of the firing capacitor 7, which may also be embodied as an electrolytic capacitor, is connected to a cathode of the rectifier diode 5 and thus to ground potential. Another main contact of the firing switch 8 is connected to a firing cap 9. The firing cap 9 is connected by its other terminal to the anode of the rectifier diode 5, and is thus also simultaneously connected to the negative electrode of the firing capacitor 4.

The firing switch 8 is preferably embodied as a switching transistor whose base is controlled by a driver signal, control signal 1, which is generated by the control unit 2 when an accident (for example crash) is sensed. The firing switch 8 is preferably provided with a current limiter to limit the current flowing across the firing cap 9. This current limiter may be implemented, for example, by virtue of the fact that an amplitude of the control signal 1 and thus a base voltage of the firing switch 8 is tapped at one of the ends of a non-illustrated resistor which is connected in series between the firing switch 8 and the firing cap 9, and is connected by its other terminal to the output of the firing switch 8. This forms, in conjunction with the electrical resistance of the firing cap 9, a resistance voltage divider so that the base voltage tapped at the voltage divider brings about current limitation. The current limitation is selected in such a way that a minimum necessary current, which is however not a higher current, flows across the firing cap 9. This makes it possible to achieve effective utilization of the power of the stored firing capacitor charge.

If the necessity to trigger the vehicle occupant protection system of the motor vehicle is sensed by appropriate sensors, for example crash sensors, the control unit 2 generates the control signal 1 with the profile specified at the firing switch 8 so that the firing switch 8 is connected through and the firing cap 9 is activated. The firing capacitors 4 and 7, which have already previously been charged to the anticipated charge voltage by the current generator 1, are initially still connected in parallel here and therefore output the charge stored in them to the firing cap 9 simultaneously and in parallel. As a result, the firing capacitor voltage drops linearly owing to a constant current flowing through the firing cap 9. After approximately half the firing time, i.e. a duration of the control signal 1, the voltage at the firing capacitors 4 and 7 has approximately halved. The control unit 2 then generates the driver signal, control signal 2, for the changeover switch 3 whose profile is specified at a base of the changeover switch 3. As is shown by comparison between curve profiles of the driver signals control signal 1 and control signal 2, a rising edge of the control signal 2 starts significantly later than that of the control signal 1. The closing of the changeover switch 3 causes the firing capacitors 4 and 7 which have been connected in parallel until now to be connected in series. As a result, the overall voltage acting at the firing cap 9 is increased so that the voltage which is necessary to maintain the constant current flowing across the firing cap 9 is made available without power losses occurring owing to an excessively high voltage. Current then flows across the firing cap 9 again until the voltages at the firing capacitors 4 and 7 are approximately halved again. The entire power drain from the firing capacitors is thus significantly higher than when the parallel connection of the firing capacitors is maintained. It is thus possible to use relatively small firing capacitors with a capacitance of, for example, 470 mF which are distinguished by reduced dimensions compared, for example, with 1,000 mF capacitors.

In the exemplary embodiment described above, the control signal 2 is generated in such a way that it starts approximately half way through the control signal 1 and is terminated essentially at the same time as the latter. The rising edge of the control signal 2 can, however, also be located before or after half the duration of the control signal 1, for example at 30% to 70% of the duration of the control signal 1, referred to the rising edge of the control signal 1.

In FIG. 2, a profile of the capacitor voltages and of the firing cap current are illustrated, the time (in seconds) being plotted on the abscissa and the voltage and/or the strength of the current being plotted on the ordinate. A curve 10 illustrates the respective voltage at the firing capacitor 4 and/or the firing capacitor 7, while a curve 11 represents the current flowing across the firing cap 9. The profile of the current 11 over time also corresponds at the same time to that of the control signal 1, i.e. a start and an end of the current 11 mark the start and the end of the control signal 1 (firing pulse).

Before the start of the triggering of the vehicle occupant protection system, the firing capacitors 4 and 7 are charged to constant potential. At a time 12, the firing pulse starts so that the current flowing across the firing cap 9 jumps to its constant value, and the voltage of the firing capacitors 4 and 7 decreases linearly. At a time 13, the changeover switch 3 switches over so that the firing capacitors 4 and 7 are then switched over from previous parallel connection to series connection. This ensures that the current 11 flowing across the firing cap 9 can be maintained at an approximately constant value despite the reduced individual voltage of the firing capacitors 4 and 7, in which case, however, the individual voltage of the firing capacitors 4 and 7 decreases linearly more quickly owing to the increased composite voltage. At a time 14, the firing pulse is switched off so that the current 11 drops to zero and the voltage of the firing capacitors 4 and 7 then remains constant because no current is being drawn off. From FIG. 2 it is clear that the voltage which is still present at the firing capacitors 4 and 7 after the firing process is only approximately a quarter of the original potential value, and accordingly an effective power drain from the firing capacitors 4 and 7 is achieved.

The rectifier diodes 5 and 6 prevent mutual equalization of charge between the firing capacitors 4 and 7 so that the capacitor charge can be reduced exclusively via the firing cap 9.

The firing circuit can also contain a voltmeter and/or ammeter 20 for measuring the voltage and/or the current of the firing pulse. A measured value is then compared with a predefined minimum limiting value, and the changeover switch 3 is switched over to the series connection of the firing capacitors when the minimum limiting value is reached.

I claim:

1. A method for firing a vehicle occupant protection system, which comprises:
   activating a firing circuit having a firing cap and a firing switch connected in series with the firing cap and the firing switch activated by a firing pulse, the firing circuit further having at least two firing capacitors connected in parallel with one another before a firing process, the firing capacitors can be charged by one of a voltage source and a current source and discharge a stored charge simultaneously into the firing cap in response to the firing pulse; and
   maintaining the firing capacitors to remain connected in parallel at a start of the firing pulse and connected in series after a time delay after the start of the firing pulse.

2. The method according to claim 1, which comprises connecting the firing capacitors in series after an expiry of a specific time interval from the start of the firing pulse.

3. The method according to claim 1, which comprises connecting the firing capacitors in series after an expiry of 30% to 70% of a duration of the firing pulse.

4. The method according to claim 1, which comprises measuring at least one of a voltage and a current of the firing pulse and connecting the firing capacitors in series if at least one of a measured voltage value and a current value drops to a specific value.

5. In combination with a vehicle occupant protection system of a motor vehicle, a firing circuit for the vehicle occupant protection system, the firing circuit comprising:

- a firing cap;
- a firing switch connected in series with said firing cap and said firing switch receiving and activated by a firing pulse;
- at least two firing capacitors to be charged by one of a voltage source and a current source;
- a control circuit connected to said firing switch and generating the firing pulse and a switch-over pulsed; and
- a changeover switch connected to said firing capacitors for switching over said firing capacitors between a parallel connection of said firing capacitors and a series connection of said capacitors, and in an event requiring firing of said firing cap said control circuit initially generating the firing pulse for simultaneously discharging said firing capacitors and only applying after a time delay the switch-over pulse to said changeover switch to switch over said firing capacitors from said parallel connection to said series connection.

6. The firing circuit according to claim 5, wherein said firing switch has a current limiting function.

7. The firing circuit according to claim 5, including a diode connected in series with one of said firing capacitors, and said changeover switch has a first terminal and a second terminal and is connected in parallel with said series connection of said diode and said one of said firing capacitors.

8. The firing circuit according to claim 7, including a further diode having a first terminal connected to said first terminal of said changeover switch and a second terminal, and another of said firing capacitors having a first terminal connected to said second terminal of said further diode and a second terminal connected directly to said second terminal of said changeover switch.

9. The firing circuit according to claim 5, wherein said firing capacitors are connected in series after expiry of a specific time interval from a start of the firing pulse.

10. The firing circuit according to claim 9, wherein the firing pulse has a duration and the specific time interval is 30% to 70% of the duration of the firing pulse.

11. The firing circuit according to claim 5, wherein said firing pulse has a voltage and a current, said firing switch has a base terminal, and including a measuring device connected to said base terminal for measuring at least one of the voltage and the current of the firing pulse, said control circuit switching over said changeover switch to the series connection if at least one of the voltage and the current has dropped to a specific value.

* * * * *